United States Patent [19]
Chung

[11] Patent Number: 5,982,431
[45] Date of Patent: Nov. 9, 1999

[54] VARIABLE BIT RATE MPEG2 VIDEO DECODER HAVING VARIABLE SPEED FAST PLAYBACK FUNCTION

[75] Inventor: Tae-yun Chung, Kwacheon, Rep. of Korea

[73] Assignee: Samsung Electric Co., Ltd., Rep. of Korea

[21] Appl. No.: 08/781,532

[22] Filed: Jan. 8, 1997

[30] Foreign Application Priority Data

Jan. 8, 1996 [KR] Rep. of Korea .......................... 96-206

[51] Int. Cl.$^6$ ....................................................... H04N 7/24
[52] U.S. Cl. .............................. 348/390; 348/845; 386/68
[58] Field of Search ..................................... 348/384, 390, 348/845; 386/14, 15, 68, 81, 82, 86, 87; 360/60

[56] References Cited

U.S. PATENT DOCUMENTS

| 5,432,769 | 7/1995 | Honjo | 369/60 |
| 5,664,044 | 9/1997 | Ware | 386/75 |
| 5,754,241 | 5/1998 | Okada | 348/419 |
| 5,809,454 | 9/1998 | Okada | 704/214 |

Primary Examiner—Bryan Tung
Attorney, Agent, or Firm—Staas & Halsey LLP

[57] ABSTRACT

A variable bit rate MPEG2 video decoder having a variable rate fast playback function includes a variable rate fast playback processor with a portion determining the fullness of a video buffer according to the amount of data input to and output from the video buffer; a fast playback rate controller for calculating a variable rate control parameter S representing the number of bi-directional predicted (B) pictures to be restored within one group of pictures (GOP) for the fast playback mode and a parameter D representing the sequence of B pictures to be restored during the fast playback mode according to the total number (T) of pictures and the number (N) of B pictures within one GOP and the buffer's fullness output from the portion for determining the fullness of the video buffer; and an effective data detector and transmitter for detecting a picture start code to detect data of a picture layer, classifying data of pictures and counting the number of B pictures to transmit effective data for the fast playback mode according to the variable rate control parameter S and the parameter D representing the sequence of B pictures. Accordingly, B pictures to be restored during the fast playback are arranged in sequence based on the buffer's fullness.

20 Claims, 9 Drawing Sheets

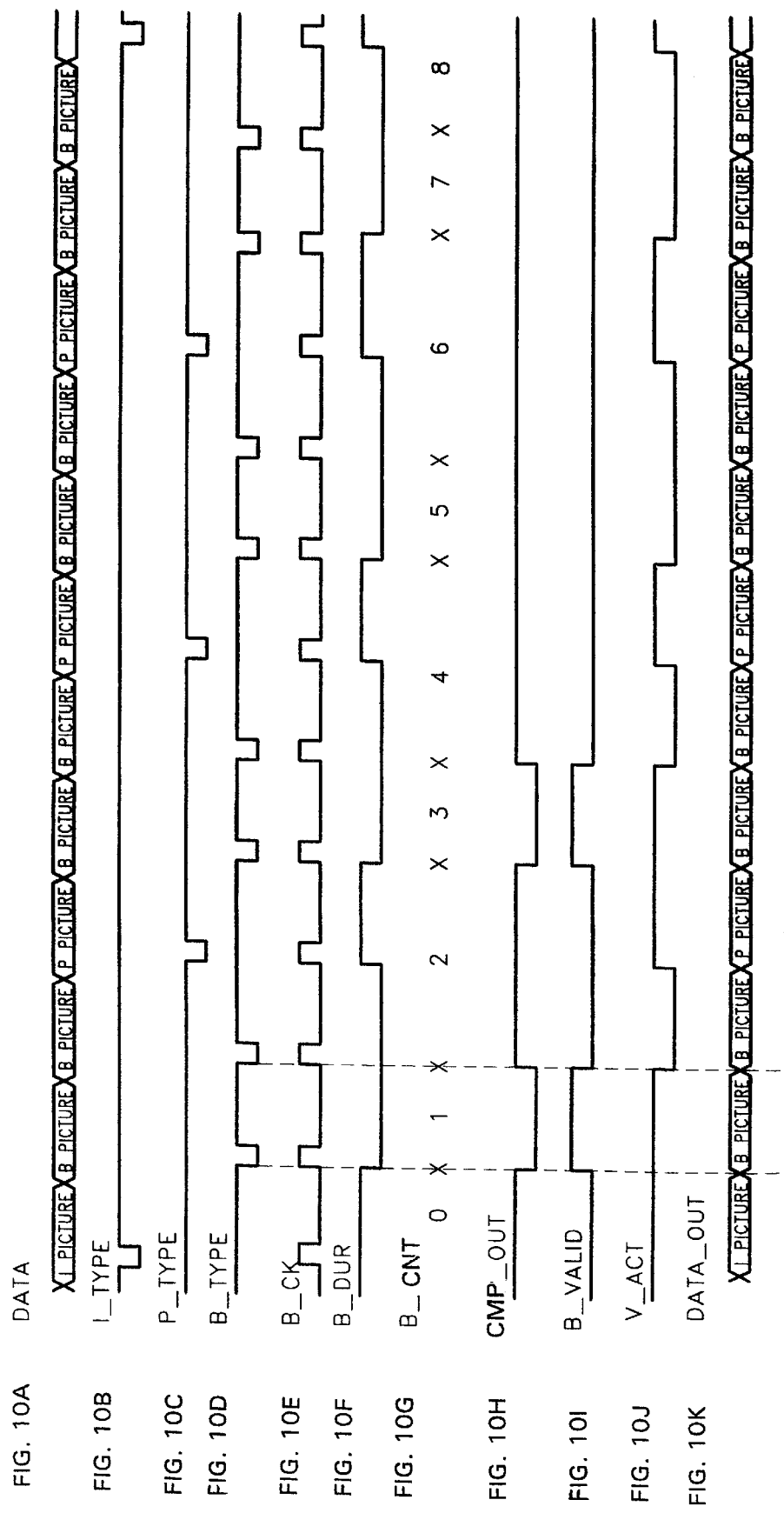

VARIABLE BIT RATE MPEG2 VIDEO DECODER HAVING VARIABLE SPEED FAST PLAYBACK FUNCTION

BACKGROUND OF THE INVENTION

1. Field of the Invention

The present invention relates to an apparatus for fast playback of moving pictures, and more particularly, to a variable bit rate MPEG2 video decoder having a variable rate fast playback function for controlling playback speed in a playback mode according to the amount of data.

Currently, systems for storage and transmission of images utilize analog signal processing techniques. However, utilization of digital image processing techniques would improve image quality, reliability of image storage and transmission, and ease of image processing. Digital image processing technology is now being applied in HDTVs, DVCRs and video conferencing systems, and the applications of digital image processing techniques will surely proliferate.

On the other hand, for images processed by digital techniques, there is an enormous amount of data compared to analog techniques. Accordingly, compression of image data is required for practicality in transmission and storage of digital image data. Also, a decoder for restoring the compressed image data back to its original form would be required.

2. Description of the Related Art

FIG. 1 is a block diagram showing the structure of a conventional variable bit rate MPEG2 video encoder which includes a first field/frame memory 110, a discrete cosine transformer (DCT) 120, a quantizer 130, a variable length coder (VLC) and multiplexer (MUX) 140, a buffer 150, an activity calculator 160, a rate controller 170, an inverse quantizer 180, an inverse DCT 190, a second field/frame memory 200, a motion estimator 210, and an adaptive estimator 220.

The first field/frame memory 110 is for storing an input source image in a field or frame unit from a frame memory 100 according to the encoding mode. The DCT 120 is for performing a discrete cosine transform with respect to a differential image signal obtained from the current image signal output from the first field/frame memory 110 and a previous image signal which has been motion-compensated. The quantizer 130 is for quantizing the output signal from the DCT 120 with a predetermined step size. The VLC & MUX 140 is for variable-length-coding the output signal from the quantizer and multiplexing a quantization parameter and a motion vector. The buffer 150 is for temporarily storing the data output from the VLC & MUX 140 before being transmitted to a receiving port via a channel at a predetermined speed. The activity calculator 160 is for calculating the estimated activity of the image signal output from the first field/frame memory 110 in a field or frame unit and the estimated activity of an intended group of pictures (GOP). The rate controller 170 is for controlling the quantizer according to the quantization step size which is determined according to the activity of the image signal output from the activity calculator 160 in a field and frame unit. The inverse quantizer 180 receives the output of the quantizer 130. The inverse DCT 190 receives the output of the inverse quantizer 180. The second field/frame memory 200 is for storing both the restored image signal output from the inverse DCT 190 and a motion-compensated restored image generated from the previous motion-compensated image signal in a field or frame unit according to the encoding mode. The motion estimator 210 is for generating a motion vector which is for constructing a current image with reference to the previous image output from the first field/frame memory. The adaptive estimator 220 adjusts a motion position of the previous image stored in the second field/frame memory 200 with the motion vector output from the motion estimator to produce the previous motion-compensated image signal for constructing the differential image signal and the motion-compensated restored image.

The variable MPEG2 video encoding mode by the encoder shown in FIG. 1 is for entropy-encoding image data which has been transformed by a motion-compensated DCT. Here, the variable bit rate MPEG2 video encoding is performed in consideration of the storage capacity of a disk, the target time of a moving picture to be recorded, the amount of data generated before the GOP to be coded and the time required for reaching the GOP, and the activity of the GOP.

FIGS. 2 and 3 show the hierarchical structure of moving picture data suggested by the MPEG. The uppermost layer of the moving picture data is a sequential layer, which includes information of a transmission bit rate. The next uppermost layer is a GOP layer having a picture structure including an intra frame (I picture) which is produced by performing encoding within the frame, a predicted frame (P picture) which is produced by performing forward-directional estimation encoding and a bi-directional predicted frame (B picture) which is produced by performing bi-directional estimation encoding. Here, the period of one GOP is equal to the period between I pictures.

Since the predetermined amount of data encoded per unit time in a fixed bit rate encoding mode cannot fully represent the real input image, the quality of the decoded image is necessarily unbalanced. FIG. 4 is a block diagram showing the structure of a conventional variable bit rate MPEG2 video decoder that attempts to address the problem inherent in all fixed bit rate encoding schemes. Even though this decoder uses complicated hardware to achieve its goal, it enhances overall image quality by controlling the amount of information to be generated in accordance with the properties of the image.

Modulated MPEG2 data is input into the playback processor 400 which demodulates and channel decodes the same. The demodulated and channel decoded data is buffered in the system controller 410 which also controls the data playback speed of the playback processor 400. In the MPEG2 system audio/video decoder 420, the buffered data from the system controller 410 is separated into compressed audio and compressed video data according to the requested video decoding speed. The separated compressed video data is decoded and converted into an analog video signal in the video digital-to-analog (D/A) converter 430 and the separated compressed audio data is decoded and converted into an analog audio signal in the video digital-to-analog (D/A) converter 440.

To perform fast playback at a speed faster than or equal to the normal playback speed of image data which has MPEG2 MP (Main Profile) @ML(Main Level) shown in FIG. 3 and has been encoded with a variable bit rate, it is important to select a frame to be decoded during the fast playback mode. Also, determination of the fast playback speed, which depends on the relation between the maximum playback speed and the maximum bit rate, is important. Specifically, to decode a P picture, the related I picture should be precedingly decoded. Similarly, I and P pictures decoding must be preceded by a B picture decoding. However, in the case of the conventional variable bit rate MPEG2 video decoder shown in FIG. 4, an underflow may occur from the buffer if the maximum playback speed is less than three times the maximum speed of the variable bit rate. Accordingly, the fast playback cannot performed perfectly.

SUMMARY OF THE INVENTION

To solve the above problem, it is an object of the present invention to provide a variable bit rate MPEG2 video decoder having a variable speed fast playback function and which performs fast playback by controlling both the number of bi-directional predicted frames (B pictures) to be restored and the restoration sequence of the B pictures.

To achieve the above object, there is provided a variable bit rate MPEG2 video decoder having a variable speed fast playback function, comprising a playback processor for demodulating and channel-decoding modulated MPEG2 data according to a playback control signal controlling data playback speed; an input buffer for buffering the demodulated and the channel-decoded data output from the playback processor; MPEG2 system layer decoding means for MPEG2-decoding the data output from the input buffer, to output compressed video data and compressed audio data; a variable speed fast playback processor for transmitting effective video data for fast playback according to a fast playback command signal which is generated dependent upon an amount of video data to be decoded, by receiving the compressed video data output from the MPEG2 system layer decoding means; a video buffer for buffering the effective video buffer output from the variable speed fast playback processor and transmitting information about the amount of buffering-operated data to the variable speed fast playback processor; video decoding means for decoding the video data output from the video buffer and outputting a data request signal according to the decoding rate; and system control means for outputting the playback control signal controlling the data playback speed of the playback processor to the playback processor according to the data request signal output from the video decoding means and an amount of data stored in the input buffer, and the fast playback command signal to the variable speed fast playback processor according to the data request signal output from the video decoding means.

Preferably, the variable rate fast playback processor comprises a portion for determining the fullness of the buffer according to the amount of data input to and output from the video buffer; a fast playback rate controller for calculating a variable rate control parameter S representing the number of bi-directional predicted (B) pictures to be restored within one group of pictures (GOP) for the fast playback mode and a parameter D representing the sequence of B pictures to be restored during the fast playback mode according to the total number (T) of pictures and the number (N) of B pictures within one GOP and the buffer's fullness outputted from the portion for determining the fullness of the buffer; and an effective data detector and transmitter for detecting a picture start code to detect data of a picture layer, classifying data of pictures and counting the number of B pictures to transmit effective data for the fast playback mode according to the variable rate control parameter S and the parameter D representing the sequence of B pictures.

Also, preferably, the portion for determining the fullness of the buffer comprises a clock synchronization circuit for synchronizing a read/write clock signal of the video buffer with a read/write strobe signal thereof to output a read/write enable signal of the video buffer; a gate circuit for gating the read/write enable signal output from the clock synchronization circuit to output a predetermined signal according to the read/write state of the video buffer; a counter for up- and down-counting a coefficient of a buffer fullness by receiving the signal outputted from the gate circuit; and a buffer fullness calculator for calculating the buffer's fullness by dividing the coefficient of the buffer's fullness outputted from the counter by the size of the video buffer.

Also, preferably, the effective data detector and transmitting portion comprises a picture type code detector for detecting a picture start code to detect the data of a picture layer and classifying codes of I, P, B picture types; latching means for latching the code of a B picture type using a predetermined signal corresponding to the combination of the picture types outputted from the picture type code detector as a clock signal; a B picture counter for counting the code of a B picture type and being reset according to the code of an I type picture; a comparator for receiving the counted value output from the B picture counter and the parameter (D) representing the sequence of B pictures to be restored to compare whether the counted value and the parameter (D) are the same; and an OR gate for OR-operating the outputs from the latching means and the comparator to output the result to the video buffer.

BRIEF DESCRIPTION OF THE DRAWINGS

The above and other objects and advantages of the present invention will become more apparent by describing in detail a preferred embodiment thereof with reference to the attached drawings in which:

FIGS. 10A through 10K are operational timing diagrams during 2× speed playback according to the embodiment of the present invention.

DETAILED DESCRIPTION OF THE INVENTION

Figure 1:
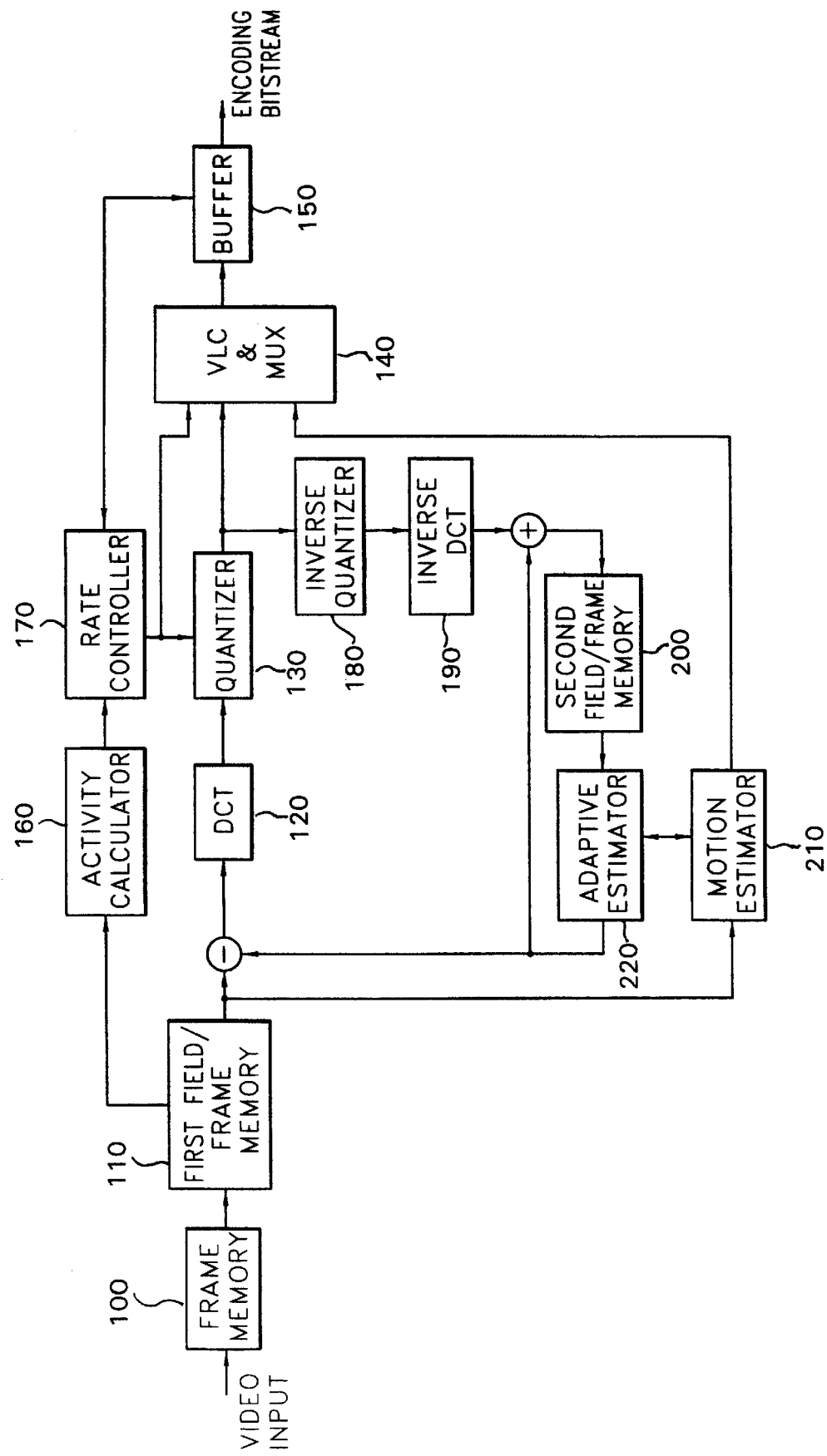
FIG. 1 is a block diagram of a conventional variable bit rate MPEG2 video encoder.
Figure 2:
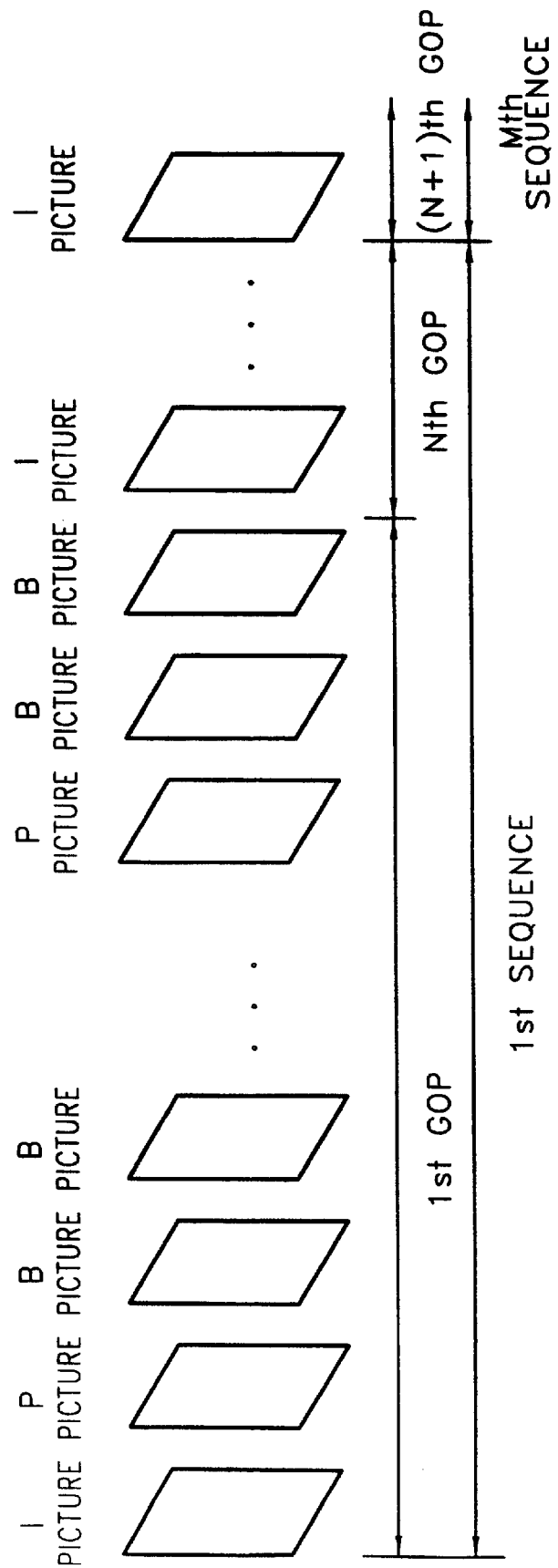
FIG. 2 shows the hierarchical structure of MPEG2 data.
Figure 3:
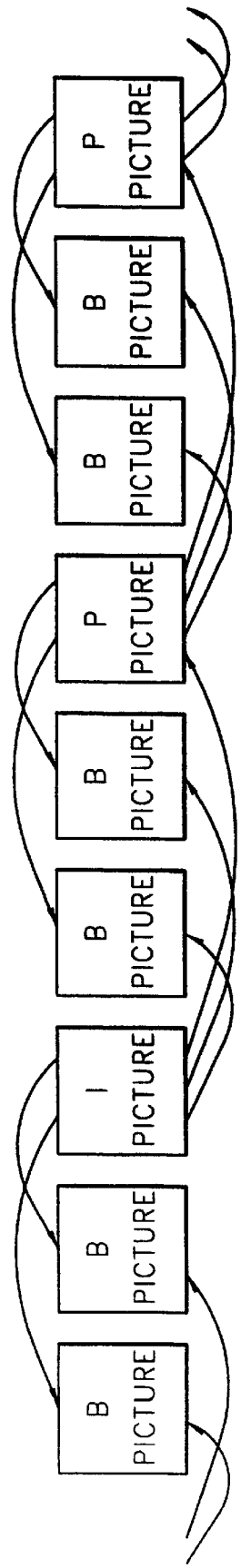
FIG. 3 shows a video frame structure in an MPEG2 system.
Figure 4:
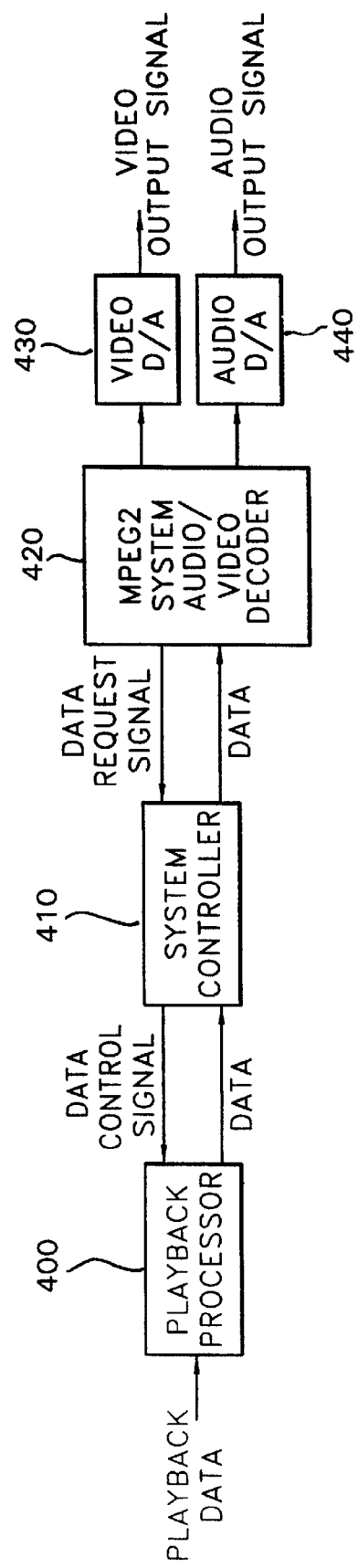
FIG. 4 is a block diagram showing the structure of a conventional variable bit rate MPEG2 decoder.
Figure 5:
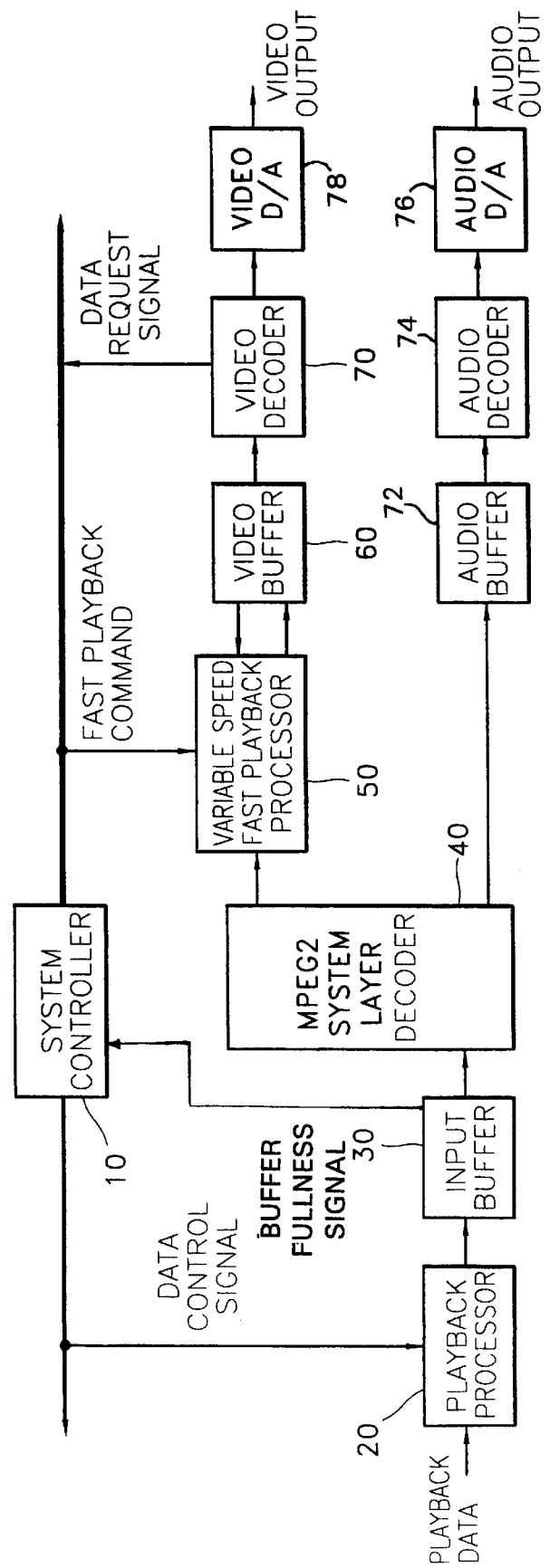
FIG. 5 is a block diagram showing the structure of a variable bit rate MPEG2 video decoder having a variable speed fast playback function according to an embodiment of the present invention.

In FIG. 5, a variable bit rate MPEG2 video decoder having a variable speed fast playback function according to a preferred embodiment of the present invention includes a system controller 10, a playback processor 20 and outputs a buffer fullness signal indicative of an amount of data in the input buffer 30, an input buffer 30, an MPEG2 system layer decoder 40, a variable speed fast playback processor 50, a video buffer 60 and a video decoder 70.

The playback processor 20 demodulates MPEG2 playback data according to a data control signal from the system controller 10 which controls the input transmission rate and channel-decodes modulated MPEG2 data. The input buffer 30 buffers the MPEG2-coded data from the playback processor 20, and the MPEG2 system layer decoder 40 performs MPEG2 decoding on the MPEG2 data output from the input buffer 30 and produces compressed video data and compressed audio data. The compressed audio data is stored in an audio buffer 72, then sent to an audio decoder 74, and then to an audio D/A 76. Also, the variable speed fast playback processor 50 receives the compressed video data output from the MPEG2 system layer decoder 40 and data output from the video buffer 60 and transmits only effective data for the fast playback according to a fast playback command output from the system controller 10. The video buffer 60 also buffers video data output from the variable speed fast playback processor 50 and transmits information about the quantity of buffered data to the variable speed fast playback processor 50. The video decoder 70 decodes data output from the video buffer 60, sends the decoded data to a video D/A 78, and generates a data request signal based on the decoding rate (when the amount of data in the video buffer falls below a certain level). The system controller 10 controls the entire system by outputting the data (playback) control signal according to the data request signal output from the video decoder 70 and the amount of data stored in the input buffer 30 (represented by the buffer fullness signal) output from the input buffer 30, and outputting the fast playback command signal according to the data request signal input from the video decoder 70.

Figure 6:
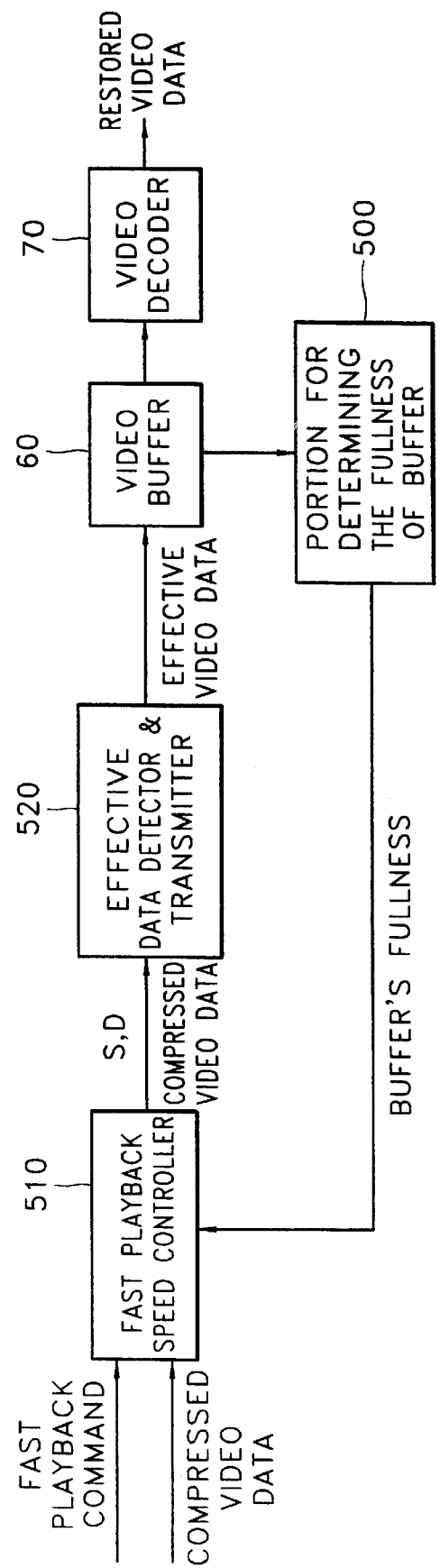
FIG. 6 is a detailed block diagram showing the structure of the variable speed fast playback processor shown in FIG. 5.

FIG. 6 is a detailed block diagram of the variable speed fast playback processor 50 shown in FIG. 5 which includes a portion 500 for determining the fullness of the video buffer 60, a fast playback speed controller 510 for calculating a variable speed control parameter S and a parameter D representing the sequence of B pictures to be restored according to the total number (T) of pictures and the number (N) of B pictures within one GOP and the buffer's fullness calculated by the portion 500, and an effective data detector & transmitter 520 for transmitting only effective video data for the fast playback mode according to the variable speed control parameter S and the parameter D representing the sequence of B pictures, which are calculated by the fast playback speed controller 510.

Figure 7:
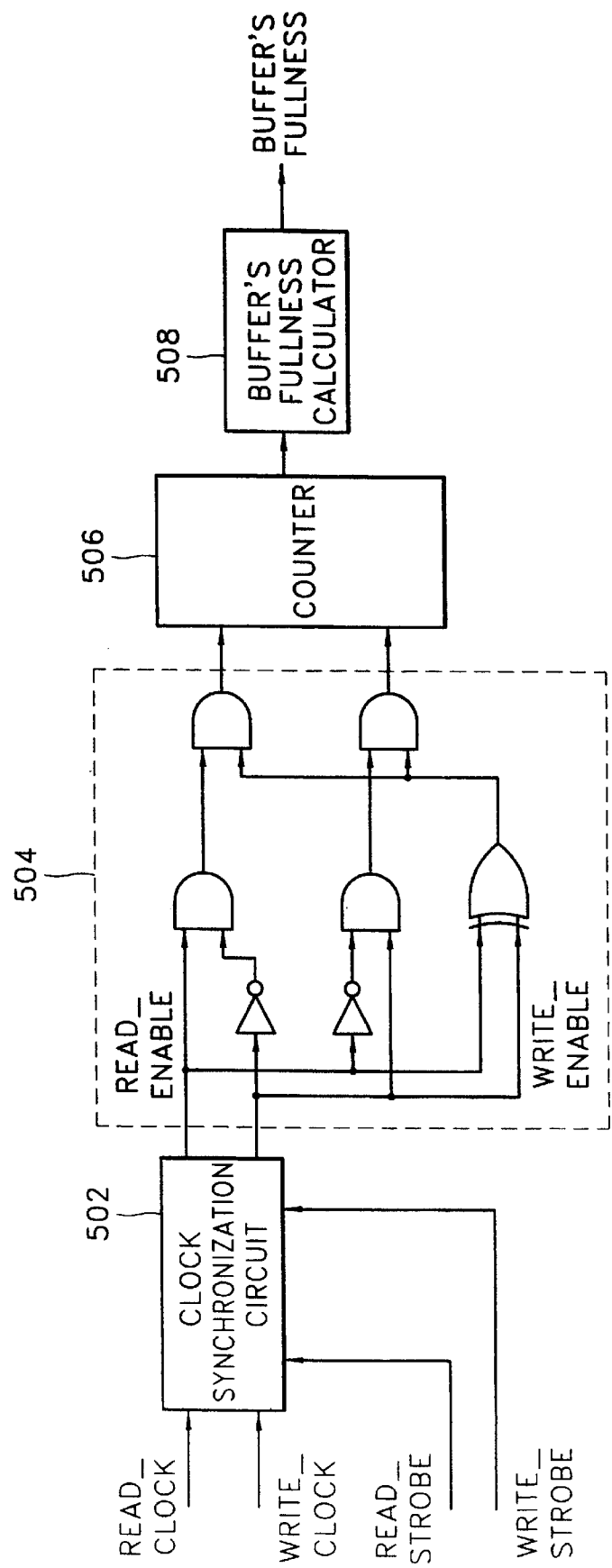
FIG. 7 is a detailed block diagram of the portion for determining the buffer's fullness shown in FIG. 6.

FIG. 7 is a detailed block diagram showing the structure of the portion 500. The portion 500 includes a clock synchronization circuit 502, a gate circuit 504, a counter 506 and a buffer fullness calculator 508. The clock synchronization circuit 502 synchronizes a read/write clock signal (read_clock/write_clock) each having a different frequency with a read/write strobe signal (read_strobe/write_strobe) representing an effective data section during a read/write operation of the video buffer 60 to output a read/write enable signal (read_enable/write_enable), and the gate circuit 504 is for gating the read/write enable signal output from the clock signal synchronization circuit 502 to produce a signal representing a read/write state of the video buffer 60. Also, the counter 506 up- and down-counts a coefficient of the video buffer's fullness by receiving the signal output from the gate circuit 504, and the buffer fullness calculator 508 calculates the video buffer's fullness by dividing the value outputted from the counter 502, by the size of the video buffer 60.

The portion 500 is designed such that the counted value, i.e., the value indicated by the counter 506, increases when the write strobe signal is active (that is, the video buffer 60 is effective only during the write operation), and the counted value decreases when the read strobe signal is active, and the counted value does not change in the other cases.

The buffer's fullness outputted from the portion 500 is obtained as follows.

$$\text{buffer's fullness} = \frac{\text{counted value}}{\text{size of video buffer}}$$

Referring back to FIG. 6, the fast playback rate controller 510 reproduces part of the B pictures as well as the I pictures and P pictures according to the buffer's fullness calculated by the portion 500 in the fast playback mode to prevent "gibberish" in a picture which is caused by the underflow of the video buffer 60.

The fast playback speed is controlled according to the total number (T) of pictures and the number (N) of B pictures within one GOP and the variable speed control parameter S according to the fullness of the video buffer 60. That is, if the buffer's fullness is greater than or equal to the buffer's fullness for 3× speed, the variable speed control parameter S is set to "0", and if the buffer's fullness is less than or equal to the buffer's fullness for 1× speed, the variable speed control parameter S is set to "N". Also, for all other cases, the variable speed control parameter S is set to "buffer's fullness×(T−N)" in reciprocal proportion to the buffer's fullness. Here, the variable speed control parameter S represents the number of B pictures to be restored during the fast playback, which is an integer obtained by rounding. Thus, the number of B pictures to be restored during the fast playback is determined by the variable speed control parameter S.

Also, to maximize the visual effect during the fast playback, the parameter D representing the sequence of the restored B pictures is determined as follows such that the playback of the continuous B pictures is prevented as much as possible.

IF (S==0) THEN D=0
ELSE
    D=2K-1, if D≦N
    D=2K-N, else D>N
ENDIF where K=1, 2, ..., S, and D is a natural number obtained through truncation.

Figure 8:
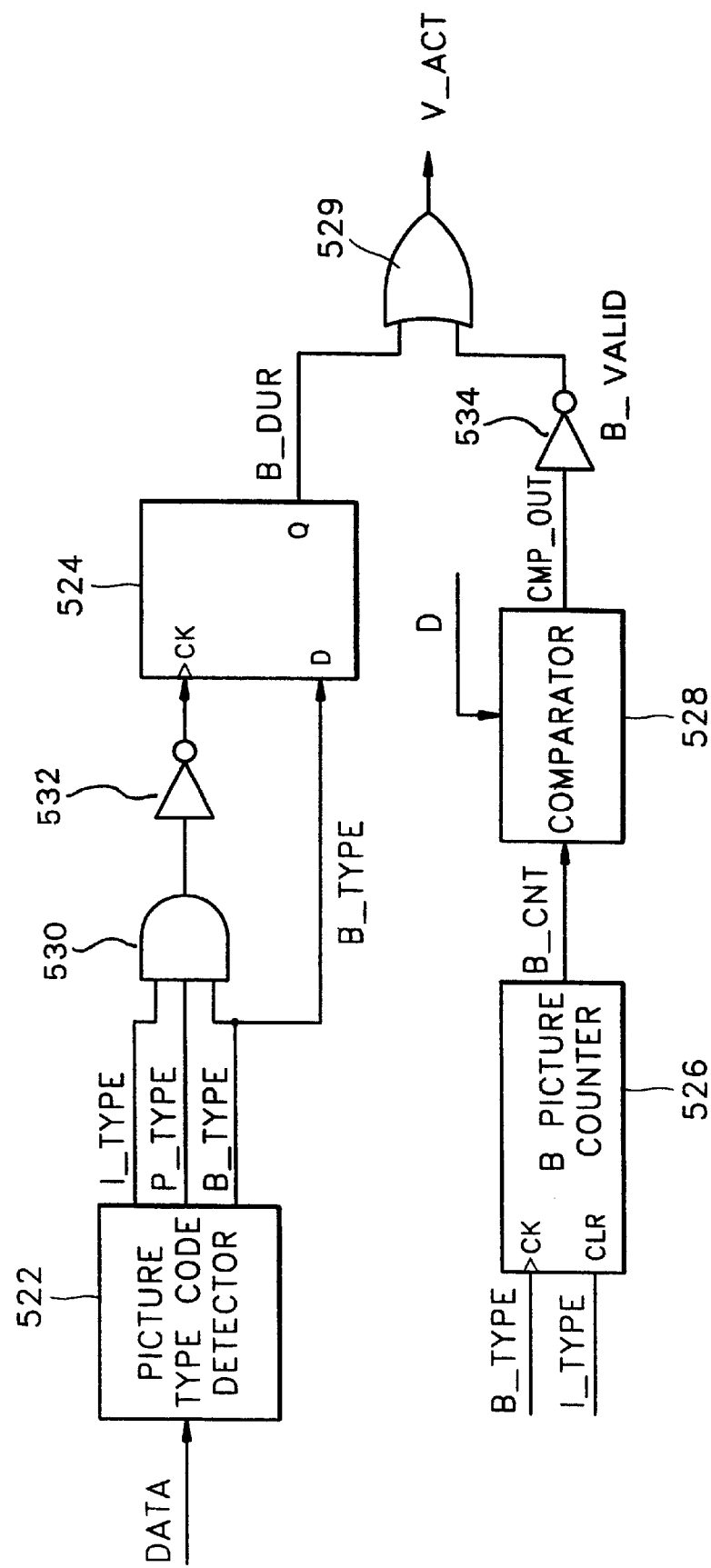
FIG. 8 is a detailed block diagram of the effective data detector and transmitter shown in FIG. 6.

FIG. 8 is a detailed block diagram showing the structure of the effective data detector and transmitter 520 shown in FIG. 6 which includes a picture type code detector 522 for detecting a picture start code to detect the data of a picture layer and classifying codes of I, P, B picture types, an AND gate 530 for receiving the outputs from the picture type code detector 522, an inverter 532 for inverting an active "low" from the AND gate 530 such that the B_TYPE value is output when one of the I, P and B_TYPE values is "low," and a latch portion (D flip-flop) 524 for latching the code of a B picture type using a predetermined signal corresponding to the I, P and B picture types output through the AND gate 530 and the inverter 532 from the picture type code detector 522 as a clock signal. The effective data detector and transmitter also includes a B picture counter 526 for counting the code of a B picture type and being reset according to the I picture type, a comparator 528 for receiving the counted value output from the B picture counter 526 and the parameter D representing the sequence of B pictures and determining whether the counted value and the parameter D are the same, an inverter 534 for inverting the output from the comparator 528, and an OR gate 529 for OR-operating the outputs of the latch portion 524 and the inverted output of the comparator 528 to produce the result V_ACT to the video buffer 60.

The part of the B pictures as well as the I and P pictures are reproduced or restored according to the state of the video buffer 60 of the variable bit rate encoder during the fast playback mode, by using the variable speed control parameter S and the parameter D representing the sequence of the restored B pictures. Accordingly, a fast playback mode of 1× to 3× speed can be performed without "gibberish" in the picture.

Figure 9:
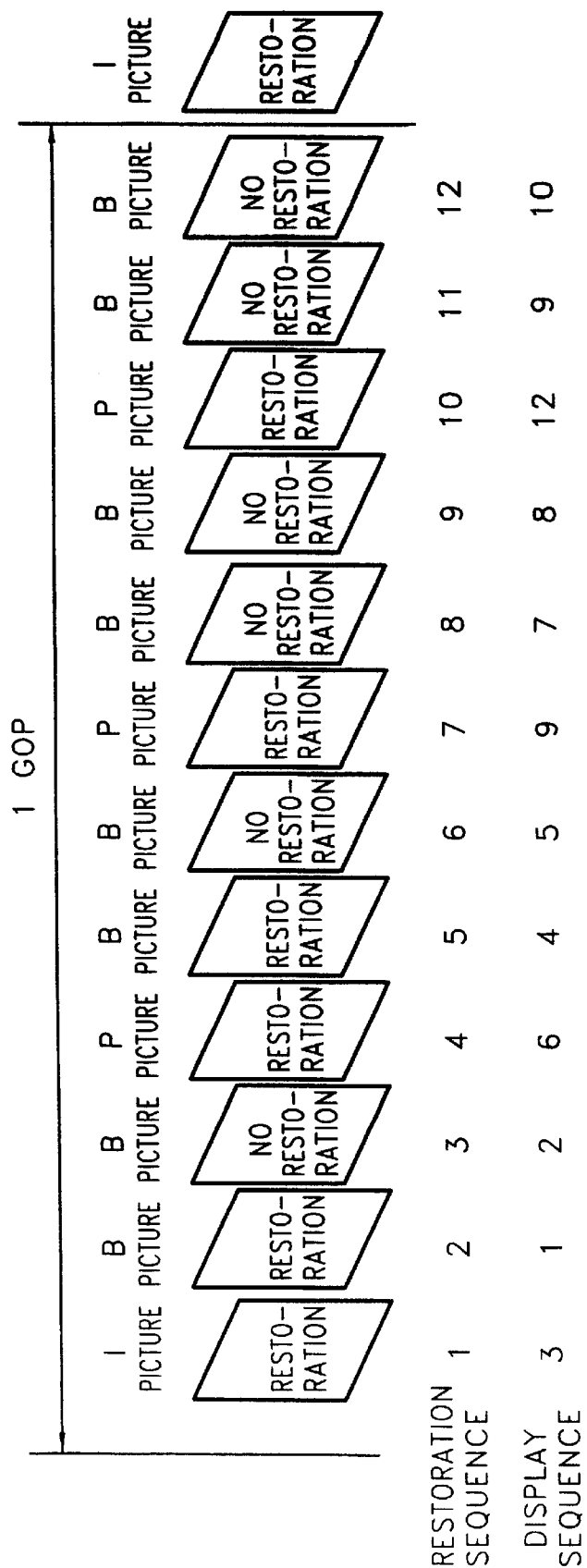
FIG. 9 is a diagram showing restoring and displaying sequences of pictures during 2× speed playback according to the embodiment of the present invention.

FIG. 9 is a diagram showing restoring and displaying sequences of pictures during 2× speed playback assuming that the variable bit rate MPEG2 video encoder of the present invention operates in the active "high" state. Also, FIGS. 10A through 10K are operational timing diagrams during 2× speed playback according to the present invention. In FIG. 9, there are 12 frames within one GOP. There are one I picture, three P pictures and eight B pictures in one GOP. For data to be played back at 2× speed, of the twelve frames, one I picture, three P pictures and two B pictures are reproduced for a total of six frames.

As described above, the variable bit rate MPEG2 video decoder having variable speed fast playback function controls the playback speed for the fast playback according to the coded variable bit rate, thereby reproducing a perfect image at the fast speed without "gibberish" or pausing of the image. Also, the number of B pictures to be restored during the fast playback is determined according to the buffer's fullness, so that the image can be effectively displayed during the fast playback.

What is claimed is:

1. A variable bit rate MPEG2 video decoder having a variable speed fast playback function, comprising:

a playback processor for demodulating and channel-decoding modulated MPEG2 data according to a playback control signal controlling data playback speed;

an input buffer for buffering the demodulated and the channel-decoded data output from said playback processor;

MPEG2 system layer decoding means for MPEG2-decoding the data output from said input buffer, to output compressed video data and compressed audio data;

a variable speed fast playback processor for transmitting effective video data for fast playback according to a fast playback command signal which is generated dependent upon an amount of video data to be decoded, by receiving the compressed video data output from said MPEG2 system layer decoding means;

a video buffer for buffering the effective video buffer output from said variable speed fast playback processor and transmitting information about the amount of buffering-operated data to said variable speed fast playback processor for use in determining a sequence of pictures to be restored to produce the effective video data;

video decoding means for decoding the video data output from said video buffer and outputting a data request signal according to the decoding rate; and system control means for outputting the playback control signal controlling the data playback speed of said playback processor to said playback processor according to the data request signal output from said video decoding means and an amount of data stored in said input buffer, and the fast playback command signal to said variable speed fast playback processor according to the data request signal output from said video decoding means.

2. A variable bit rate MPEG2 video decoder as claimed in claim 1, wherein said variable rate fast playback processor comprises:

a portion for determining a fullness of the video buffer according to the amount of data input to and output from said video buffer;

a fast playback speed controller for calculating a variable rate control parameter S representing a number of bi-directional predicted (B) pictures to be restored within one group of pictures (GOP) for the fast playback mode and a parameter D representing the sequence of the B pictures to be restored during the fast playback mode according to a total number (T) of pictures and the number (N) of B pictures within one GOP of the video data input from said MPEG2 system layer decoding means and the buffer fullness output from said portion for determining the fullness of the buffer, by receiving the fast playback command signal from said system control means; and an effective data detector and transmitter for detecting a picture start code to detect data of a picture layer, classifying data of pictures and counting the number of B pictures, to transmit effective data for the fast playback mode according to the variable rate control parameter S and the parameter D representing the sequence of B pictures.

3. A variable bit rate MPEG2 video decoder as claimed in claim 2, wherein said portion for determining the fullness of the buffer comprises:

a clock synchronization circuit for synchronizing a read/write clock signal of said video buffer with a read/write strobe signal thereof to output a read/write enable signal of said video buffer;

a gate circuit for gating the read/write enable signal output from said clock synchronization circuit to output a predetermined signal according to the read/write state of said video buffer;

a counter for up- and down-counting a coefficient of said video buffer fullness by receiving the signal output from said gate circuit; and a buffer fullness calculator for calculating fullness of said video buffer by dividing the coefficient of the fullness of said video buffer output from said counter by the size of said video buffer.

4. A variable bit rate MPEG2 video decoder as claimed in claim 3, wherein said counter up-counts each time the write strobe signal is active and down-counts each time the read strobe signal is active.

5. A variable bit rate MPEG2 video decoder as claimed in claim 2, wherein said effective data detector and transmitter comprises:

a picture type code detector for detecting a picture start code, to detect the data of a picture layer and classifying codes of an intra frame (I picture) type, wherein the I picture is produced by performing encoding within one frame a predicted frame (P picture) type, wherein the P picture is produced by performing forward-directional estimation encoding and a B picture type, wherein the B picture is produced by performing bi-directional estimation encoding;

latching means for latching the code of a B picture type using a predetermined signal corresponding to the combination of the picture types output from said picture type code detector as a clock signal;

a B picture counter for counting the code of a B picture type and being reset according to the code of an I type picture;

a comparator for receiving the counted value output from said B picture counter and the parameter (D) representing the sequence of the B pictures to be restored, to compare whether the counted value and the parameter (D) are the same; and an OR gate for OR-operating the outputs from said latching means and said comparator to output the result to said video buffer.

6. A variable bit rate MPEG2 video decoder as claimed in claim 2, wherein said portion for determining the fullness of the buffer comprises:

a clock synchronization circuit for synchronizing a read/write signal of said video buffer with a read/write strobe signal thereof to output a read/write enable signal of said video buffer;

a gate circuit for gating the read/write enable signal output from said clock synchronization circuit to output a predetermined signal according to the read/write state of said video buffer; and a buffer fullness determining unit for determining the fullness of said video buffer based upon the predetermined signal output by said gate circuit according to the read/write state of said video buffer.

7. A variable bit rate MPEG2 video decoder as claimed in claim 2, wherein said fast playback speed controller sets the variable speed control parameter S equal to the buffer fullness×(T−N).

8. A variable bit rate MPEG2 video decoder as claimed in claim 2, wherein said fast playback speed controller sets the variable speed control parameter S equal to the buffer fullness×(T−N), wherein the buffer fullness equals the counter value of said counter/a size of said video buffer.

9. A variable bit rate MPEG2 video decoder having a variable speed fast playback mode, comprising:

a video buffer to receive and output compressed video data; and a processing unit that determines a fullness of said video buffer, calculates a number of B pictures to be restored during a fast playback mode based upon the fullness of said video buffer, and outputs only the B pictures to be restored to said video buffer for subsequent decoding wherein the B pictures are bi-directional predicted frames which are produced by performing bi-directional estimation encoding of a group of pictures (GOP) of moving picture data.

10. A variable bit rate MPEG2 video decoder as claimed in claim 9, wherein said processing unit comprises:

a variable speed fast playback processor to transmit only effective video data for the fast playback mode based upon a fast playback command signal dependent upon an amount of the video data to be decoded;

a video decoder to decode the video data output from said video buffer and to output a data request signal according to the decoding rate; and a system controller to output the fast playback command signal based upon the data request signal from said video decoder.

11. A variable bit rate MPEG2 video decoder as claimed in claim 10, wherein said processing unit further comprises:

a playback processor to demodulate and channel-decode modulated MPEG2 data according to a data control signal controlling data playback speed of the video data;

an MPEG2 system layer decoding unit to MPEG2 decode the data output from said playback processor, to output compressed video data;

wherein said variable speed fast playback processor converts the compressed video data into the effective video data, and said system controller outputs the data control signal to control the data playback speed.

12. A variable bit rate MPEG2 video decoder as claimed in claim 11, wherein said variable rate fast playback processor comprises:

a portion for determining a fullness of said video buffer according to the amount of data input to and output from said video buffer;

a fast playback speed controller for calculating a variable rate control parameter S representing a number of bi-directional predicted (B) pictures to be restored within one group of pictures (GOP) for the fast playback mode and a parameter D representing the sequence of the B pictures to be restored during the fast playback mode according to a total number (T) of pictures and the number (N) of B pictures within one GOP of the video data input from said MPEG2 system layer decoding means and the buffer fullness output from said portion for determining the fullness of the buffer, by receiving the fast playback command signal from said system control means; and an effective data detector and transmitter for detecting a picture start code to detect data of a picture layer, classifying data of pictures and counting the number of B pictures, to transmit effective data for the fast playback mode according to the variable rate control parameter S and the parameter D representing the sequence of B pictures.

13. A variable bit rate MPEG2 video decoder as claimed in claim 12, wherein said portion for determining the fullness of the buffer comprises:

a clock synchronization circuit for synchronizing a read/write clock signal of said video buffer with a read/write strobe signal thereof to output a read/write enable signal of said video buffer;

a gate circuit for gating the read/write enable signal output from said clock synchronization circuit to output a predetermined signal according to the read/write state of said video buffer;

a counter for up- and down-counting a coefficient of said video buffer fullness by receiving the signal output from said gate circuit; and a buffer fullness calculator for calculating fullness of said video buffer by dividing the coefficient of the fullness of said video buffer output from said counter by the size of said video buffer.

14. A variable bit rate MPEG2 video decoder as claimed in claim 10, wherein said processing unit further comprises:

a playback processor to demodulate and channel-decode modulated MPEG2 data according to a data control signal controlling data playback speed of the video data;

an input buffer to buffer the demodulated and the channel-decoded data output from said playback processor and output a buffer fullness signal indicative of an amount of the data stored in said input buffer;

an MPEG2 system layer decoding unit to MPEG2 decode the data output from said input buffer, to output compressed video data;

wherein said variable speed fast playback processor converts the compressed video data into the effective video data, and said system controller outputs the data control signal to control the playback speed and the decoding rate of the variable bit rate to said playback processor in accordance with the data request signal from said video decoder and the buffer fullness signal from said input buffer.

15. A variable bit rate MPEG2 video decoder as claimed in claim 13, wherein said fast playback speed controller sets the variable speed control parameter S equal to the buffer fullness×(T−N).

16. A variable bit rate MPEG2 video decoder as claimed in claim 13, wherein said fast playback speed controller sets the variable speed control parameter S equal to the buffer fullness×(T−N), wherein the buffer fullness equals the counter value of said counter/a size of said video buffer.

17. A variable bit rate MPEG2 video decoder as claimed in claim 10, wherein said variable rate fast playback processor comprises:

a portion to determine the fullness of said video buffer based upon the amount of the video data input to and output from said video buffer;

a fast playback speed controller to calculate a variable rate parameter S representing a number of the B pictures to be restored within the GOP for the fast playback mode and a parameter D representing a sequence of the B pictures to be restored during the fast playback mode according to a total number (T) of pictures and the number (N) of B pictures within the GOP of the video data and the video buffer fullness, in response to receipt of the fast playback command signal; and an effective data detector and transmitter to detect a picture start code to detect data of a picture layer, and classify data of pictures and count the number of pictures, to transmit effective video data for the fast playback mode according to the variable rate control parameter S and the parameter D representing the sequence of the B pictures.

18. A variable bit rate MPEG2 video decoder as claimed in claim 17, wherein each GOP includes an intra frame (I picture) which is produced by performing encoding within one frame, a plurality of predicted frames (P pictures) which are produced by performing forward-directional estimation encoding, and a plurality of the B pictures, and said effective data detector and transmitter reproduces and restores the I, P and B pictures according the fullness of said video buffer during the fast playback mode.

19. A variable bit rate MPEG2 video decoder as claimed in claim 10, wherein said variable rate fast playback processor comprises:

a portion to determine the fullness of said video buffer based upon the amount of the video data input to and output from said video buffer;

a fast playback speed controller to calculate a variable rate parameter S representing a number of the B pictures to be restored within the GOP for the fast playback mode and a parameter D representing a sequence of the B pictures to be restored during the fast playback mode according to a total number (T) of pictures and the number (N) of B pictures within the GOP of the video data and the video buffer fullness, in response to receipt of the fast playback command signal; and an effective data detector and transmitter to detect a picture start code to detect data of a picture layer, and classify data of pictures and count the number of pictures, to transmit effective video data for the fast playback mode according to the variable rate control parameter S and the parameter D representing the sequence of the B pictures.

20. A variable bit rate MPEG2 video decoder as claimed in claim 9, wherein each GOP includes an intra frame (I picture) which is produced by performing encoding within the (a) frame, a plurality of predicted frames (P pictures) which are produced by performing forward-directional estimation encoding, and a plurality of the B pictures, and said effective data detector and transmitter reproduces and restores the I, P and B pictures according the fullness of said video buffer during the fast playback mode.

* * * * *